Sept. 3, 1968 J. R. VANDE WEGE 3,400,229

MAINTENANCE PROVISIONS FOR PULSE SEQUENCED EQUIPMENT

Filed July 30, 1965 13 Sheets-Sheet 1

INVENTOR
JOHN R. VANDEWEGE

BY [signature]
ATTY.

MAINTENANCE PROVISIONS FOR PULSE SEQUENCED EQUIPMENT

Filed July 30, 1965

MAINTENANCE PROVISIONS FOR PULSE SEQUENCED EQUIPMENT

Filed July 30, 1965

13 Sheets-Sheet 4

Sept. 3, 1968 J. R. VANDE WEGE 3,400,229

MAINTENANCE PROVISIONS FOR PULSE SEQUENCED EQUIPMENT

Filed July 30, 1965 13 Sheets-Sheet 7

MAINTENANCE PROVISIONS FOR PULSE SEQUENCED EQUIPMENT

Filed July 30, 1965

13 Sheets-Sheet 10

United States Patent Office 3,400,229
Patented Sept. 3, 1968

3,400,229

MAINTENANCE PROVISIONS FOR PULSE SEQUENCED EQUIPMENT

John R. Vande Wege, Glen Ellyn, Ill., assignor to Automatic Electric Laboratories, Inc., Northlake, Ill., a corporation of Delaware Filed July 30, 1965, Ser. No. 476,077
10 Claims. (Cl. 179—175.2)

This invention relates to maintenance provisions for pulse sequenced equipment, and more particularly to maintenance and fault detection provisions for equipment having electronic logic circuits with sequenced operation controlled by a pulse clock, for example, the control equipment as used in electronic communication switching systems.

One object of the invention is to stop the supply of repetitive pulses which control the logic steps, and manually generate the pulses, with an arrangement to insure that only one pulse is supplied to the logic circuit for each operation of a manual push button.

Another object of the invention is to provide parity check apparatus between redundant circuits in two pieces of equipment.

Still another object of the invention is to provide timing means to insure that a trouble indication is supplied if the equipment fails to complete a cycle of operation within a given time, with a provision for checking the time of subportions of the cycle and the response of the equipment at the receipt of a signal which should start a cycle of operation.

One difficulty with manually controlled single pulse control arrangements is the tendency of metallic contacts to bounce and therefore to generate additional pulses.

According to one feature of the invention, a single pulse is gated from a train of pulses by using metallic contacts with a known bounce characteristic and using a timing arrangement in which the output pulse gate can only be able to pass one pulse during the time in which metallic contacts can bounce. The pulse clock normally supplies interlaced trains of repetitive pulses on two leads, and the manual control is arranged to selectively supply a single pulse to either of the output leads. Two pulse gates are connected in tandem between the clock and the output for each lead, and a stop clock manual control is provided to disable all four of these pulse gates for maintenance purposes preliminary to operation of the manual single pulse push buttons. Use is made of a multivibrator already present in the equipment to provide a timing pulse every 1.3 milliseconds. The input pulse gate from the clock for each of the two pulse trains is enabled by this timing pulse to supply one pulse to each of two intermediate leads, one for each of the pulse trains, every 1.3 milliseconds. Two flip-flops are provided to control the supply of the pulses from the intermediate lead via the second or output pulse gate for each train to the output leads. On operation of one of the two manual pulse selection switches a corresponding one of these two flip-flops is set and in response thereto the corresponding output pulse gate is enabled to gate one pulse to the output lead, and this output pulse is used to set the other flip-flop, which disables the output pulse gate to block any further pulses until the push button is released.

The single pulse arrangement is provided with a visual indicator arrangement such as lamps to indicate that the pulse has been supplied to the output on a particular lead.

In a communication switching system the switching apparatus of a particular section is usually divided into a plurality of groups each serving a number of lines, each group having a switching network for connecting any one of a plurality of outlets. It is desirable to provide two markers for a section to provide redundancy so that one marker may be taken out of operation for maintenance purposes. Normally, one marker may, for example, serve the even numbered switching groups and the other the odd number groups. Since each marker must be capable of serving all of the switching groups, the call for service signal leads from each group are connected to an individual input of an allotter in each marker.

In the arrangement according to the invention each allotter is arranged to have some sections which are normally active to serve its own switching groups, and normally passive stages for use to serve the other switching groups when they are transferred to the corresponding marker.

According to a feature of the invention, each allotter is provided with a parity check relay having two differentially wound windings, one winding being energized in response to a signal from one of its active stages, and the other winding being energized in response to a signal at the corresponding passive stage in the other allotter, so that the relay remains unoperated if parity is correct, and only operates if the signal appears in one allotter and not in the other.

Another feature of the invention relates to a timing arrangement in which each marker is provided with an operational timer which causes a trouble signal to be supplied if the marker stays in any one sequence state beyond a given time, and the allotter is provided with a separate relay timing arrangement if the overall time for a cycle of the operation of the marker exceeds a given limit. A subalarm relay arrangement is also provided to insure that the marker responds to a service request signal within a given time and to supply a trouble signal if it does not.

The above-mentioned and other objects and features of this invention, and the manner of attaining them will become more apparent, and the invention itself will be best understood, by reference to the following description of an embodiment of the invention taken in conjunction with the accompanying drawings comprising FIGS. 1–17 wherein:

FIGS. 2–6 are to be arranged; and

FIGS. 7 and 8 are to be arranged.

The features of the invention may be incorporated in the markers of the line group, the group selector, or the trunk group switching section of the Communication Switching System disclosed in U.S. Patent No. 3,170,041, issued Feb. 16, 1965 to K. K. Spellnes. More particularly the features may be incorporated in the sequence and supervisory circuits and in the allotter and transfer circuits of the markers. The line group marker is disclosed in U.S. application Ser. No. 304,892, filed Aug. 27, 1963 by W. R. Wedmore for Marker For A Communication Switching Network; and the group selector marker is described in U.S. patent application Ser. No. 414,174, filed Nov. 27, 1964, by W. R. Wedmore et al. for Arrangements In a Communication Switching System. It has been chosen to illustrate the features as incorporated in the markers of the trunk group section which is further described herein. Junctor and trunk circuits and other aspects of the trunk group section are disclosed in my U.S. patent application Ser. No. 404,764, filed Oct. 19, 1964 for Supervisory Apparatus. A control center including a trouble recorder for use in the switching system is disclosed in U.S. patent application Ser. No. 278,954, filed May 8, 1963 by W. R. Wedmore for Communication Switching Equipment Supervisory Apparatus.

*The trunk group*

The trunk group provides access for incoming trunks from outside of the office or for special intra-office trunks such as operator or wire chief. The trunk group comprises one or more trunk group matrices and two electronic markers.

*Trunk group matrix*

Each trunk group matrix consists of the seventy-five incoming or special trunks, a two-stage network of crosspoint switches, and a connect circuit. A trunk group matrix is capable of connecting any one of seventy-five incoming trunks to any one of sixteen registers on a single output level basis. All trunks in the same group of seventy-five are either dial pulse (DP) or multi-frequency (MP). Each matrix is independently controlled but outlets are graded to provide sharing of registers.

Figures 13, 16, 17:
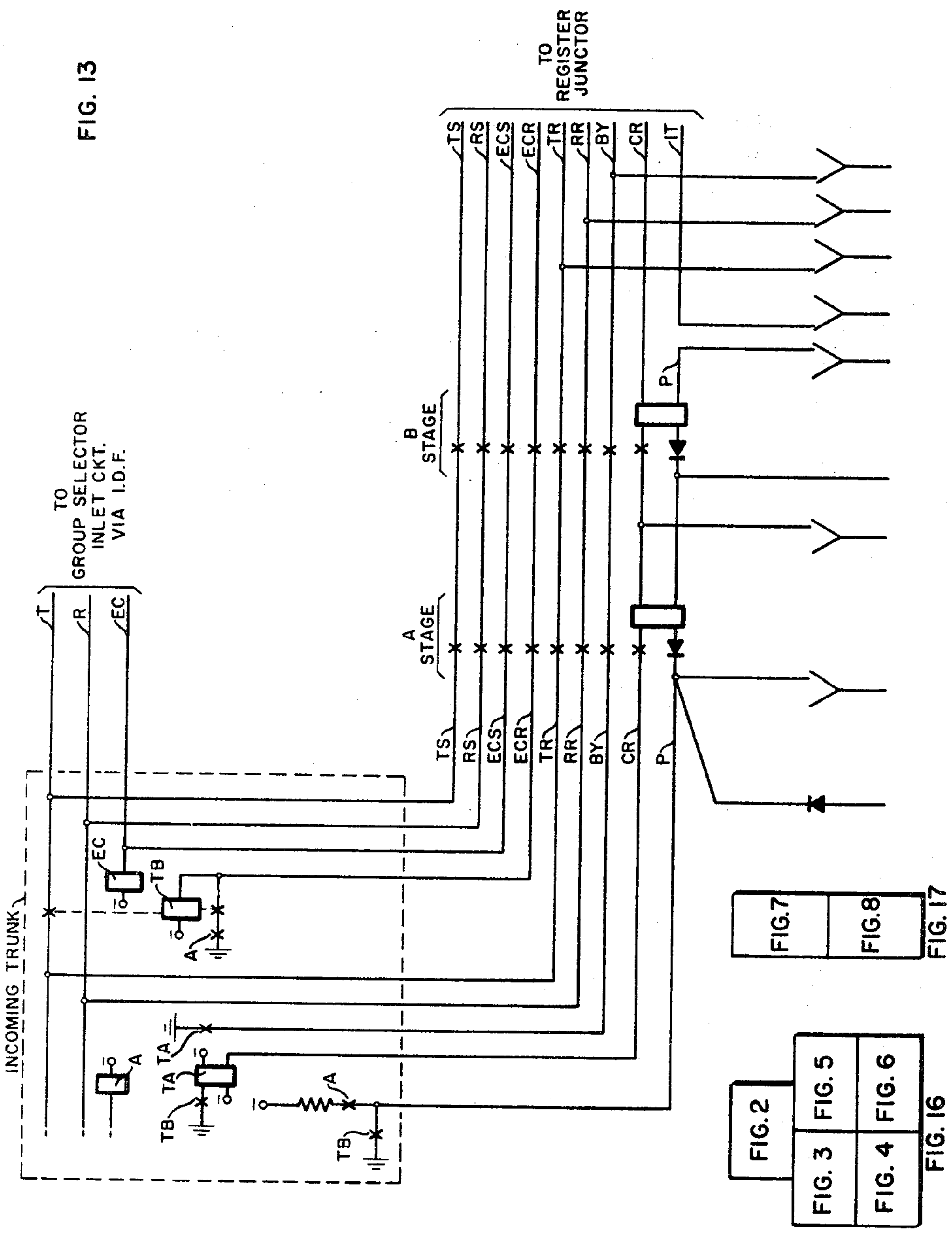
FIG. 13 shows a typical trunk and crosspoint switch.
FIG. 16 shows how
FIG. 17 shows how

The incoming trunk shown in FIG. 13, is equipped with loop splitting facilities, and access is provided from a trunk to a register and an additional path is provided from the register-sender to an inlet circuit of the group selector. When the call has reached its destination, the incoming trunk switches through to the established path, the crosspoints of the trunk group matrix associated with this call are released by the register-sender.

The matrix consists of a two-stage network of crosspoint switches shown in FIG. 13. The incoming trunks, divided into five stage, the A stage. The A stage has twenty outlets or links (four for each of the five groups) appearing as inlets to the B stage. The B stage has sixteen outlets or links to register junctions.

A single crosspoint consists of a relay with two windings, an operate (or pull) winding and a hold winding, and has eight "make" contact sets. Two of these contact sets switch the transmission loop leads TR and RR to the register junction, and three switch the transmission loop leads RS and TS and extra control lead ECS from the sender to the group selector matrix, one locks the hold winding via the control lead CR; one connects the operate winding of the cut-through relay in the trunk via external control lead ECR to the register junctor; and one connects the operate winding of the busy tone relay in the trunk via lead BY to the register junctor.

Figure 12:
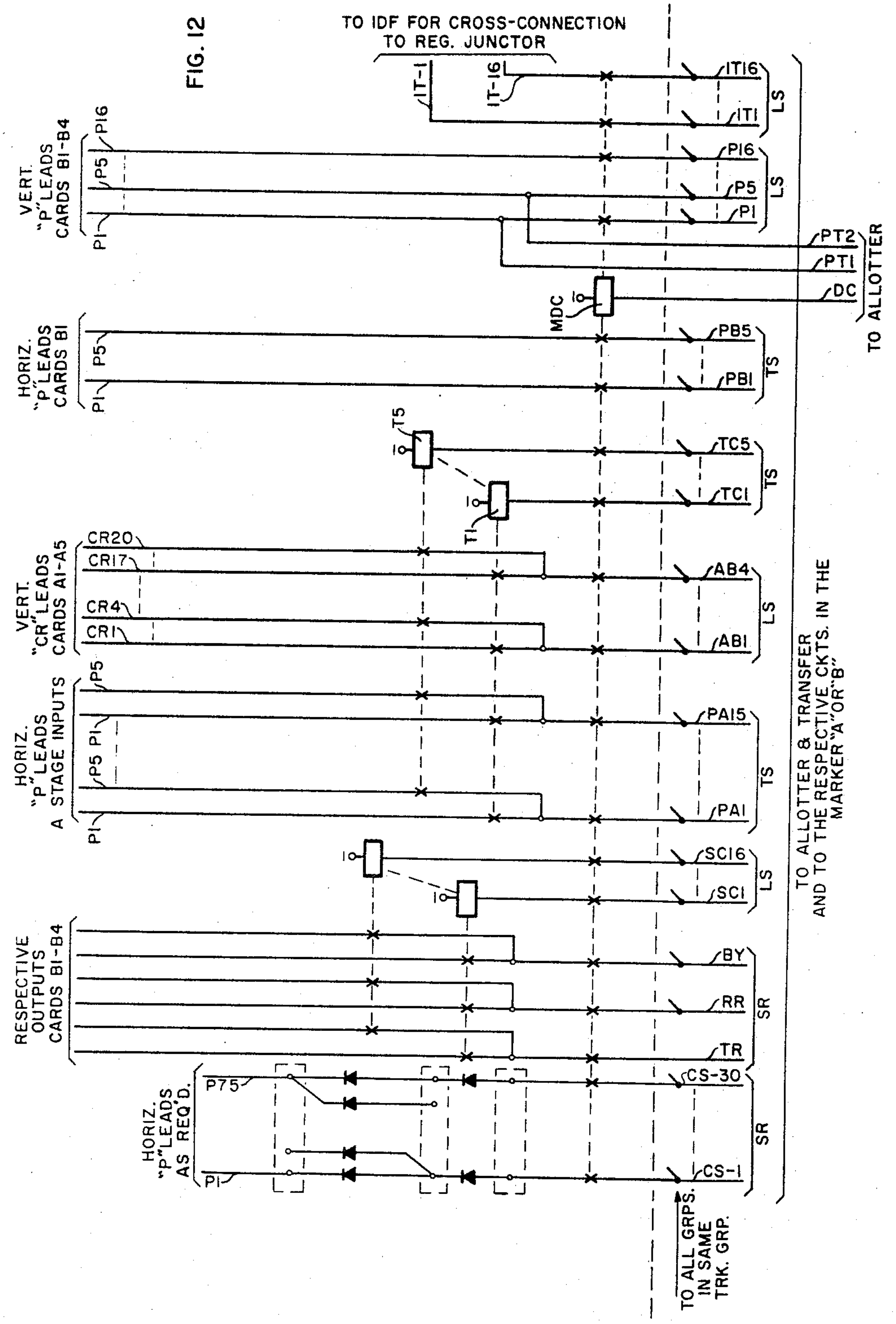
FIG. 12 is a schematic of a connect circuit.

The connect circuit, shown in FIG. 12, provides means for connecting information leads within a selected trunk group matrix to a common set of conductors betwen a trunk group marker and the crosspoint network that it serves. On a command from the allotter of a respective marker an MDC relay of the selected unit operates. Connecting to the set of conductors; matrix pull leads PB1–5 common to each group of fifteen trunks; the pull leads P1–16 of fifteen trunks and sixteen outlets to register junctors; the leads CR1–20 of the A–B links associated with these fifteen trunks; the idle test leads IT1–16 of the register junctor outlets the di-phase information leads BY, RR and TR to the seletced outlet; and the class-of-service information leads CS1–30 from all trunks. The relay trees under control of the marker connect the proper set of A–B link "CR" leads and fifteen trunk pull leads; and the di-phase information leads corresponding to the chosen outlet.

*The trunk group marker*

The operation of the trunk group matrix is controlled by an electronic marker which has control of all relays and sets up connections on a one-at-a-time basis. The marker operated in response to a call for service from a trunk group matrix and sets up a path based on information concerning the condition of a register junctor (busy or idle) and the condition of any link (busy or idle). The holding time of the marker is approximately fifty milliseconds which is well within the interdigital switching time of any direct controlled system.

*Operational description*

Two trunk group markers continually and independently of each other are monitoring the trunk group matrices for new calls. The trunk group matrices are divided between the two markers up to a maximum of five groups per marker. Each marker serves its associated group matrices on allotted basis, but is also capable of assuming the load of its companion marker. After the call is identified, the register junctors are scanned. Link availability information is combined with the scanner output such that an idle register junctor can be selected only if an idle link exists to that junctor.

Before operating the matrix crosspoints, the class-of-service of the trunk is detected. An incoming trunk may be assigned any one of 225 classes-of-service by a simple strapping operation. The class-of-service, trunk group, and trunk identity are electronically pulsed out to the register sender via the link connecting the matrix and the register. High speed serial sending of information is employed.

When the register acknowledges receipt of information, the connection is established through the matrix and held by the register junctor. If all operations are successful, the marker enters a "clear out" interval, wherein all functioning circuits are permitted to restore to normal before attempting to process other awaiting calls. If no registers are available, the "clear out" period is entered immediately.

*Sequence and supervisory*

Sequence and supervisory circuit 112 (FIGS. 7 and 8) provides the sequenced control of all trunk group section circuits and the common supervisory logic for all trunk group marker circuits. Operational timer 109 provides the required time periods, TP, to sequence states for assurance of correct marker operations. A master 25 kc. clock circuit 110 provides timing pulses CPA and CPB throughout the marker to set and reset control flip-flop logic to drive shift registers and to drive counters and scanners.

A sequence state generator, comprising flip-flops SSA–SSE with their associated coded DC set and reset commands, gated pulse amplifiers AC commands a common logic, and the decoder logic utilizing the output of flip-flops SSA–SSE, provides the ten states or marker function periods. The condition for each of the states is given below in the equation form for both the set and reset conditions of each control state flip-flop.

| Enter state | Command | Flip-flop change |
|---|---|---|
| S1 | =S9 CON $\overline{\mathrm{CAL}}$ (8TP+17TP) $\overline{\mathrm{H10}}$. | Set FF–SSA and reset FF–SSE. |
| S2 | =S1 TID 6TP | Set FF–SSB. |
| S3 | =S2 UID RJ 6TP | Set FF–SSC. |
| S4 | =S3 C5 Z 11TP | Set FF–SSD. |
| S5 | =S4 P $\overline{\mathrm{Z}}$ | Set FF–SSE. |
| S6 | =S5 SS | Reset FF–SSA. |
| S7 | =S6 TMD | Reset FF–SSB. |
| S8 | =S7 BSY 11TP | Reset FF–SSC. |
| S9 | =S8 BSY PF P 14TP | Reset FF–SSD. |
| | +S10 TG $\overline{\mathrm{H10}}$ | Set FF–SSE. |
| S10 | =S9 CON (8TP+17TP) | Reset FF–SSE. |
| | +S2 LJS 6TP | Reset SSA and SSB. |

*Operational description*

Figure 7:
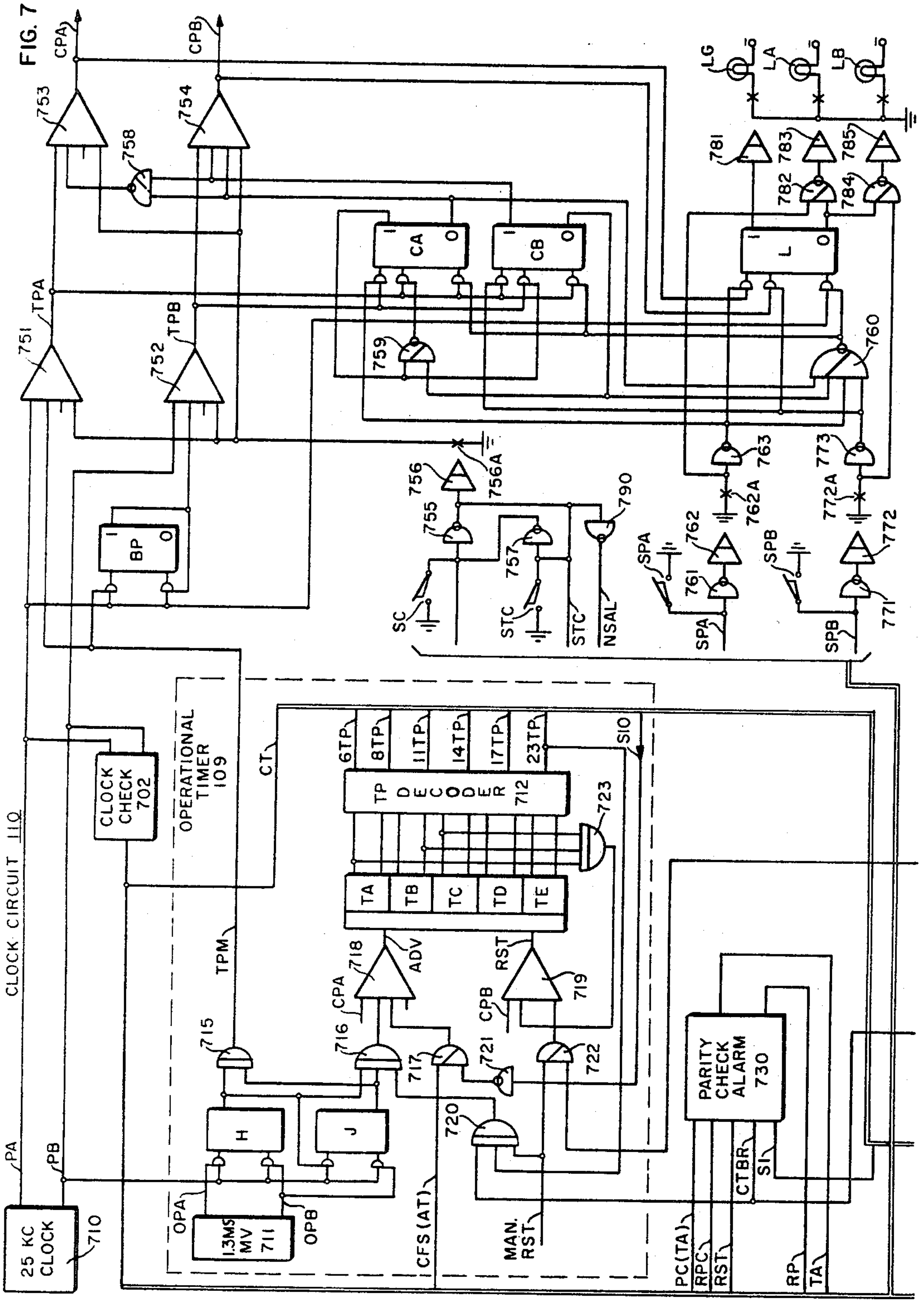
FIGS. 7 and 8 show functional block diagram of sequence and supervisory circuit and the operational timer and clock.
Figure 8:
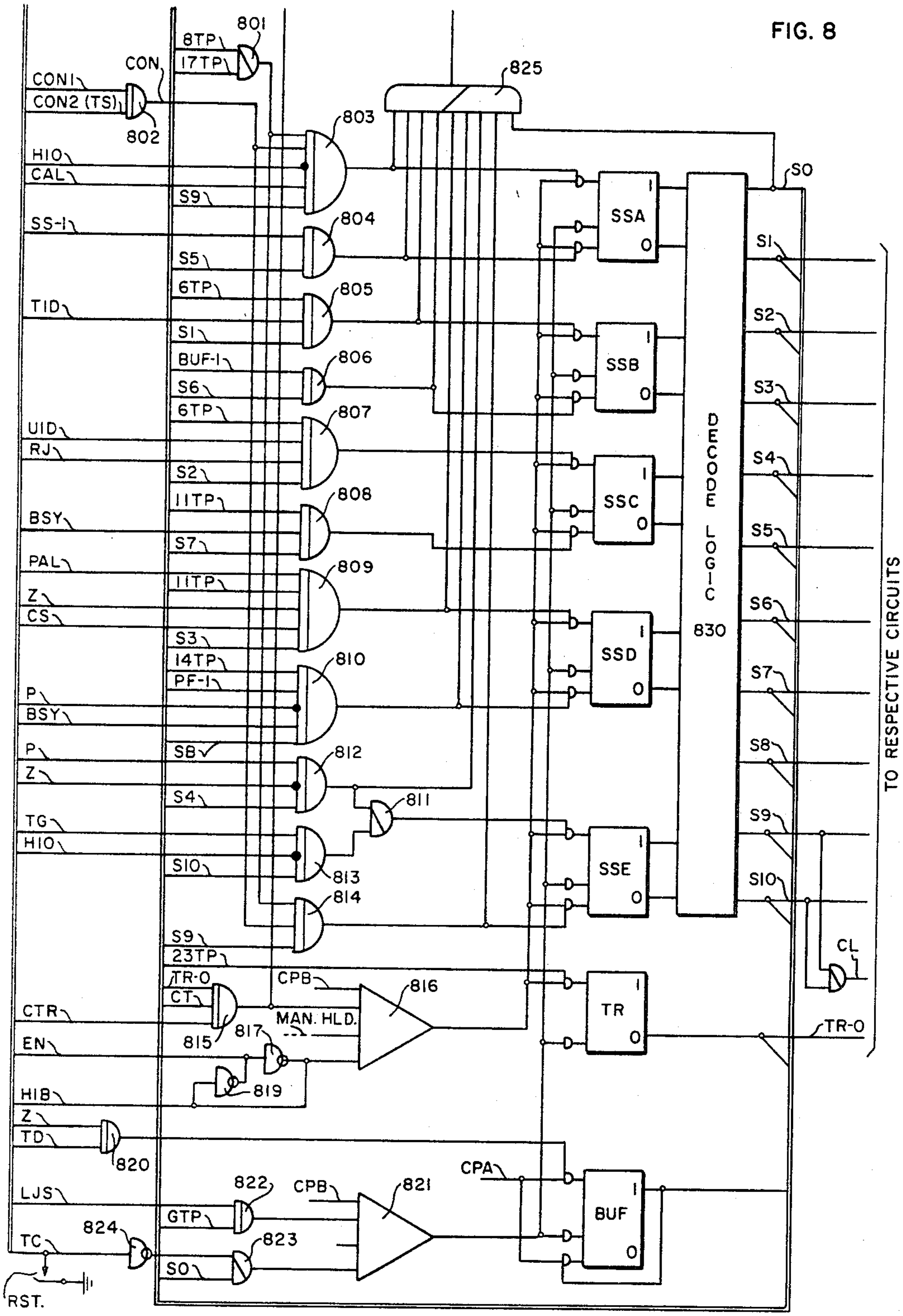

Referring to FIGS. 7 and 8 of the drawings, when in the idle state S10, the marker continually scans the matrices for a request-for-service mark. When a call-for-service mark is detected a signal on lead CFS from the allotter starts the operational timer 109. A true signal on lead TG and state S10 (S10 TG) via gates 813 and 811 sets flip-flop SSE and the marker advances to state S9.

State S9 provides a wait time dependent on point of entrance. If entered from S10, 8TP time is provided for operation of allotter relays A and B and matrix connect relays MDC.

The command (8TP S9 CON) to the input of gate 814 resets flip-flop SSE. The command (S9 CON CAL 8TP) to the input of gate 103 resets operational timer 109 and sets flip-flop SSA. The marker advances to state S1. During state S1 a trunk selector 104 starts scanning the identity of one of the five A matrix units that contains the call-for-service mark by coincidence between scanner output and a mark on an output pull lead P from each A unit. When coincidence appears the scanner is stopped and the signal on lead TID becomes true. The identity is locked in, and a relay MDC in the matrix connect circuit MC is operated to connect the pull leads on the input side of the identified A unit (tens) to the trunk selector circuit 104. The output of gate 805 at the (S1 TID 6TP) command sets flip-flop SSB and resets the operational timer 109. The marker then advances to sequence state S2.

In sequence state S2, the marker starts the trunk scanner in trunk selector 104, and the register junctor scanner in the link selector circuit 107. The identity as to which of the fifteen trunks of a chosen A matrix unit is calling for service is established by coincidence between units scanner output and a mark on an input lead PA to the A matrix unit. When the signal on lead UID becomes true the identity is locked in. The register junctor scanner chooses a register junctor that is idle and can be reached via A–B links. The output (CR) leads of a chosen A unit are checked to determine link availability. A parallel test circuit of the link selector 107 checks the register junctor for idle condition via lead IT1–16. If the idle register junctor is not found, the marker releases the trunk group being served and upon the command LJS 6TP CPB resets the marker to serve another of the assigned trunk groups. If the idle register junctor is located, a scanner in the link selector 107 is stopped. Leads RR, TR and BY are partially connected from the trunk number identification sender 108 to the chosen register junctor, and the pull lead P of the outlet associated with the chosen register junctor is connected to the link selector circuit 107. The output of gate 107 on a (S2 UID RJ 6TP) command sets flip-flop SSC and resets operational timer 109, the marker advances to sequence state S3.

In sequence state S3, pull leads PA1–15 are disconnected from the trunk scanner in the trunk selector 104, a class-of-service potential is then connected to the chosen trunk via P leads and the class-of-service leads CS1–30 are connected to the send-receive circuit 108. When the class-of-service identification operation is completed lead CS becomes true. Also in sequence state S3 all flip-flops in TNI sender 108 are reset, true signal on lead 2. The output of gate 809 on a (S3 CS Z 11TP PAL) command sets flip-flop SSD and resets the operational timer 109. The marker advances to sequence state S4.

In sequence state S4, the shift register in the TNI sender 104 is loaded with trunk and marker identity and the class-of-service, to generate signal $\overline{Z}$. A check for the completed operation of the diphase sender connect relays is performed and a condition mark is set via lead P. The output of the gate 112 on a (S4 $\overline{Z}$ P) command sets flip-flop SSE and resets the operational timer 109. The marker to sequence state S5.

In sequence state S5, a call-for-service mark to register junctor is sent, a wait time for "start-send" signal from register junctor is received via lead SS. On a (S5 SS) command at the input to gate 104, flip-flop SSA and operational timer are reset. The marker advances to sequence state S6.

In sequence state S6, the shift register sends its information by diphase to the register. When all the information is sent the signal on lead Z becomes true. The diphase sender in the TNI sender 108 is stopped. A (TD Z CPA) command sets flip-flop BUF. A (S6 BUF) command at gate 106 resets flip-flop SSB and operational timer. The marker then advances to sequence state S7.

In sequence state S7, the diphase sender and class-of-service connect relays are disconnected from the TNI sender 108. A ground potential is connected to the B stage outlet pull lead P′ of the selected register junctor. A sufficient time is allowed for matrix crosspoint relays to operate and hold in series with relay TA in the trunk requesting service. A ground potential is also applied to the A stage inlet pull lead P to generate a signal BSY in the trunk selector circuit 104. Upon the (S7 BSY 11TP) command to gate 808, flip-flop SSC is reset. The marker advances to sequence state S8.

In sequence state S8, the pull leads PA1–15 and PB1–5 are connected to the trunk scanner in the trunk selector circuit 104, lead CON. A ground potential, in link selector 107 on one of the pull leads P1–16 is disconnected from the matrix, lead $\overline{P}$, and check to see if cross-points hold lead BSY. If there was no parity between the call-for-service via different paths in sequence states S9, S10, and S1, call for fault recorder via signal on lead PF. The output of gate 110 on a (S8 BSY $\overline{P}$ $\overline{PF}$ 14TP) resets the flip-flop SSD and the operational timer 109. The marker then advances to sequence state S9. If other call-for-service is present the marker advances to state S1 to begin the cycle of operation just described. If no call-for-service is present the marker advances to its idle state S10.

The operational timer 109 derives its basic timing from 1.3 milliseconds multivibrator 711. A counter comparing flip-flops TA–TE and a decoding logic 712 utilizing the outputs from these flip-flops generate TP periods. Periods of 6TP, 8TP, 11TP, 14TP and 17TP are "wait" periods. TP23 is a time out or maximum period that may be held by a sequence state before, a trouble logic command is generated. The timer resets in states S1, S2, S4, S5, S6, S7 and S10. Derived from 1.3 milliseconds multivibrator trunk group marker wait intervals are:

| | |
|---|---|
| TP= 1.3 ms | Wait periods for normal operations. |
| 6TP= 7.8 ms | |
| 8TP=10.4 ms | |
| 11TP=14.3 ms | |
| 14TP=18.2 ms | |
| 17TP=22.1 ms | |
| 23TP=29.9 ms | Sequence state time out. |

To ensure sufficient time for certain operations in the system, a basic 25 kc. clock circuit 710, FIG. 7 generates two sets of pulse trains designated as PA and PB. Each train of pulses is of approximately two microseconds duration, occurring every 40 microseconds. PA and PB pulse trains are identical except that one is lagging the other by twenty microseconds. These two trains of pulses are gated through their respective gated pulse amplifiers and are supplied to the system as the CPA and CPB pulse trains.

To provide for the maintenance and trouble analyzing operations in case of a malfunction in the system, the timer is provided with a means to stop the sending of both the CPA and CPB pulse trains, a means to generate individual pulses, a means to ensure the sending of a single pulse in response to a manual initiation, and means to overcome the possible effects of contact bounce generating from such manual operation. The existing 1.3 millisecond multivibrator 711 provides a time cycle during which a required single CPA or CPB pulse will be sent. For a cleaner make and break operation, snap action switches are used. These snap action switches operate their respective relay drivers to set the associated flip-flop. The output of these flip-flops enables one of the gated pulse amplifiers to emit the desired single CPA or CPB pulse.

Referring to FIG. 7 under normal conditions pulses PA and PB from the 25 kc. clock circuit 11 are sent through the gated pulse amplifiers 751, 753 and 752, 754 respectively. The lower inputs of these amplifiers being true permits the train of pulses designated as CPA and CPB to be supplied to the system. In the event of trouble in the system and prior to trouble analyzing, these pulses must be stopped. To stop these pulses the ground from an activated switch SC is extended to the input of inverter 755 making its output true to energize relay driver 756. Through the latching circuit of inverters 757 and 755 relay driver 756 remains operated until released by ground extended from push button STC. Ground at contacts 756A inhibits the gated pulse amplifiers 751, 752, 753 and 754 at their lower inputs thus removing the CPA and CPB pulses from system. However, a set of two pulse trains designated as TPA and TPB are generated at the output of gated pulse amplifiers 751 and 752 respectively. The TPA and TPB train of pulses occur at intervals of approximately 1.3 milliseconds with a duration of approximately two microseconds. The TPA and TPB train of pulses are identical except that TPB pulses lag TPA pulses by 20 microseconds.

Figure 9:
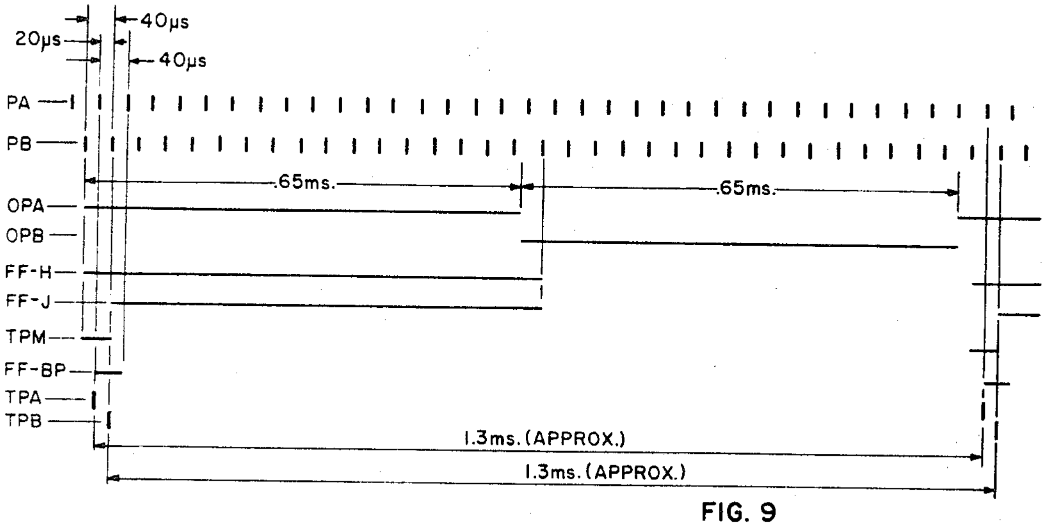
FIGS. 9, 10 and 11 are pulse timing graphs of the clock.

Referring to FIG. 7 and FIG. 9 it can readily be seen how these TPA and TPB pulses are generated. Assume that signal from 1.3-millisecond multivibrator 711 on lead OPA becomes true at a PB pulse from the 25 kc. clock 110. Flip-flop H is set making the signal on lead TPM from the output of gate 701 true. Signal on lead TPM enables flip-flop BP at its DC set input, and enables gates pulse amplifier 751 at its second input. The following PA pulses from 25 kc. clock 110 generates a TPA pulse at the output of gated pulse amplifier 751, as sets flip-flop BP. The output of flip-flop BP becomes true, and thus enabling the gated pulse amplifier 752 at its second input, it also provides its own reset pulse. The following PB pulse generates TPB pulse at the output of gated pulse amplifier 752, and sets flip-flop J making the signal TPM not true. Another PA pulse resets flip-flop BP thus making its own output not true. Flip-flops H and J remain set for the remainder of 0.65 millisecond that the OPA is true. The conditions for making TPM signal true are not present. When OPA becomes not true and OPB true for 0.65 millisecond the PB pulse from the 25 kc. clock 110 and OPB reset flip-flops H and J thus TPM signal still remains not true preventing TPA or TPB pulses from being generated at the output of their respective amplifiers. Only when the signal on lead OPA from the multivibrator becomes true again will it generate a pair of TPA and TPB pulses. Thus the pulses on leads TPA and TPB are generated at the minimum of 1.28 milliseconds and the maximum of 1.32 milliseconds intervals.

Figure 10:
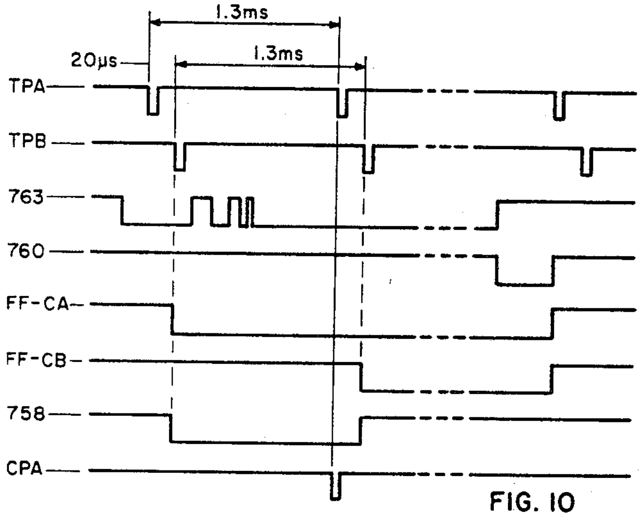

Assume that the required single pulse to be sent is that on lead CPA. FIG. 7 and a pulse chart in FIG. 10 show how this can be accomplished. Activating switch SPA a ground is extended to inverter 761 making its output true to operate relay driver 762. A ground at contact 762A inverted by inverter 763 becomes true, inhibiting gate 760 and enabling flip-flop CA at its DC set input. The first TPB pulse sets flip-flop CA enabling gated pulse amplifier 753 at its second input, from the true output of gate 758. Flip-flop CA also enables flip-flop CB to be set. The following TPA pulse generates single pulse CPA. At the next TPB pulse flip-flop CB is set making the output of gate 758 not true thus inhibiting the gated pulse amplifier 753 from further generating CPA pulses. Before another CPA or CPB single pulse can be generated flip-flops CA and CB must be reset. But the output of gate 760 being (773 CA CB 765), the DC reset signal will be not true until the switch SPA is restored releasing relay driver 762 and by removing the ground at contacts 762A to the input of inverter 763. The output from inverter 763 being not true enables the output of gate 760 to be true thus enabling the flip-flops CA and CB to be reset in coincidence with the first TPA pulse.

Figure 11:
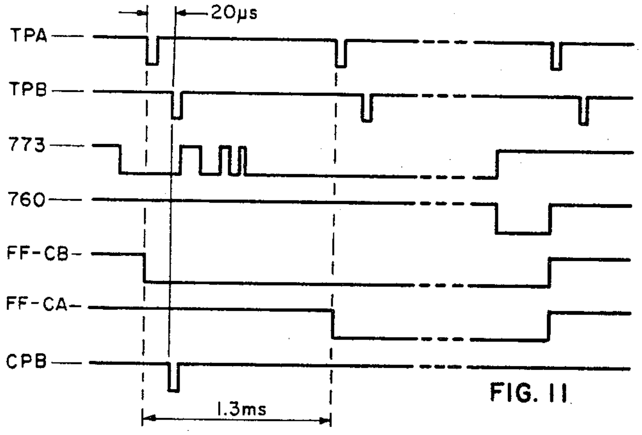

The relay driver circuit having a sealed reed capsule with a set of contacts having known response times is used as the interface between the electronic logic circuitry and manual operated switches. The relay driver will close its contacts if the input is at the ungrounded potential "1," and will release if the input is at ground potential "0." The response characteristics of relay drivers 762 and 772 are shown in FIGS. 10 and 11 as the outputs of inverters 763 and 773 respectively. The actual values of the response times in milliseconds of the relay driver are as follows:

| | Minimum | Nominal | Maximum |
|---|---|---|---|
| Operate time | 1.38 | 1.50 | 1.66 |
| Bounce time | .06 | .50 | .94 |
| Release time | .95 | 1.40 | 1.75 |

The relay driver will tolerate a D.C. input noise voltage of −0.66 volt with no possibility of operation.

The sending of a single CPB pulse can be clearly understood by following the schematic circuit in FIG. 7 and a timing chart shown in FIG. 11. This is accomplished in a manner similar to sending a CPA pulse, except that the switch SPB is activated and flip-flop CB is set first.

The visual means of indicating the type of operation being performed is also provided. This is accomplished by flip-flop L, and the respective SPA and SPB switches in coincidence with a respective single CPA or CPB pulse.

*Transfer control circuit*

The transfer control circuit provides means of alloting the markers A and B with the assigned group matrices, and also provides means of transferring all leads from all trunk groups from one marker to its companion marker. It provides the logic for the transfer operation whether initiated by the trouble recorder, manual push button or transfer timer, and means to disconnect both markers from group matrices. The commands and malfunction information are routed to the fault recorder via test and routiner access circuits.

Figure 1:
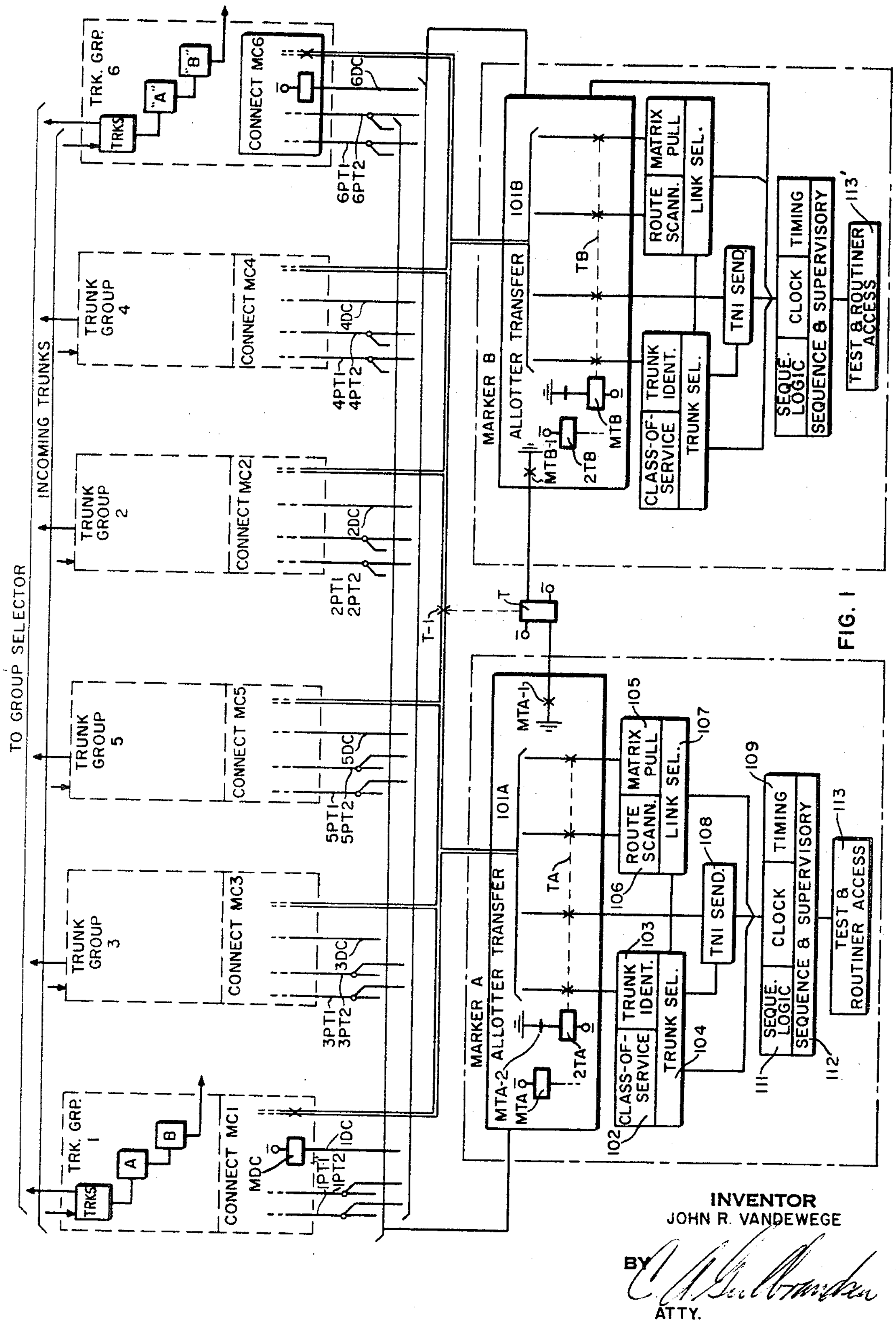
FIG. 1 is a block diagram of a trunk group section as used in the telephone switching exchange.
Figure 2:
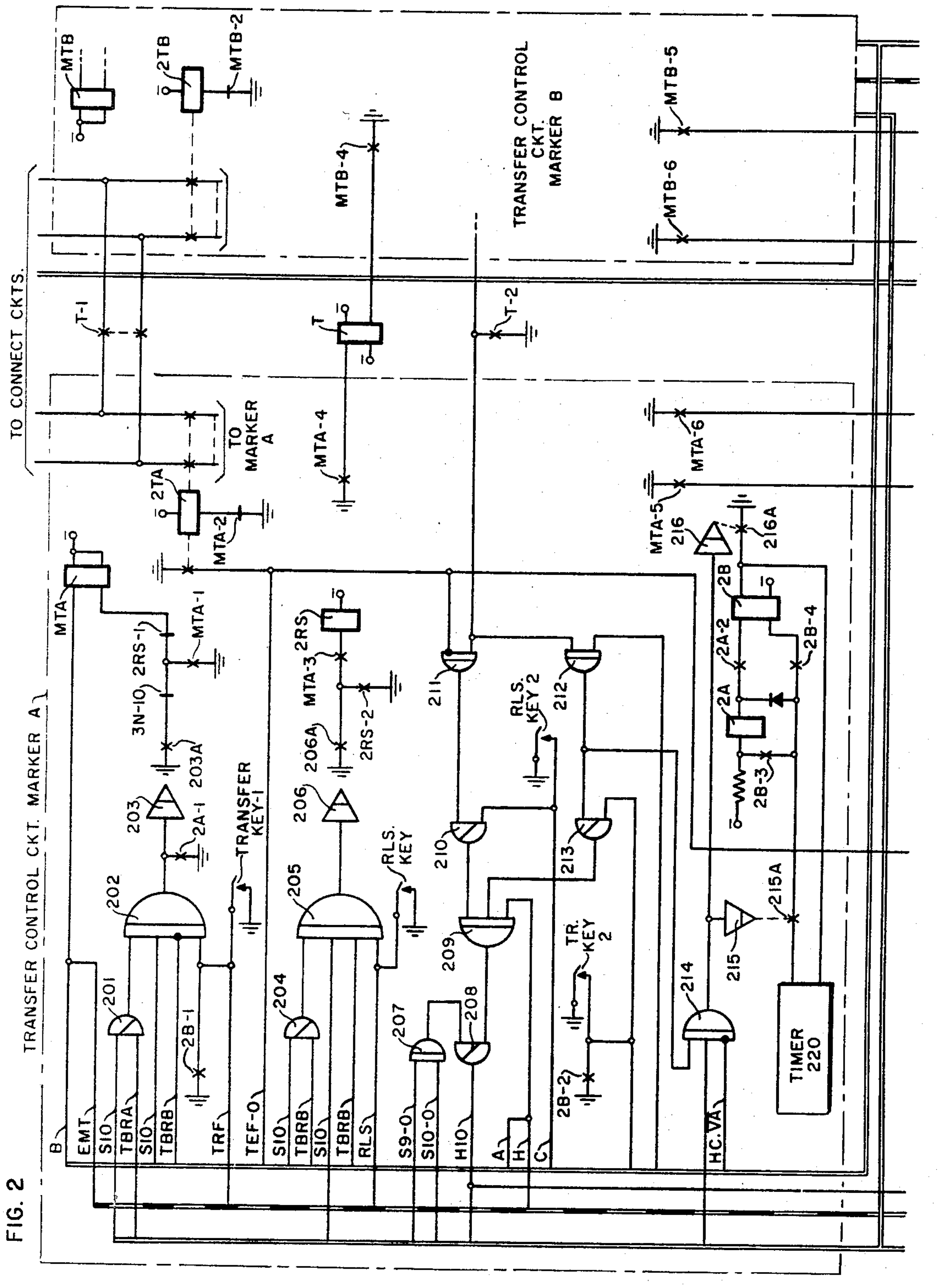
FIGS. 2–6 show a functional block diagram of the two allotters A and B and their associated transfer control circuits.
Figure 3:
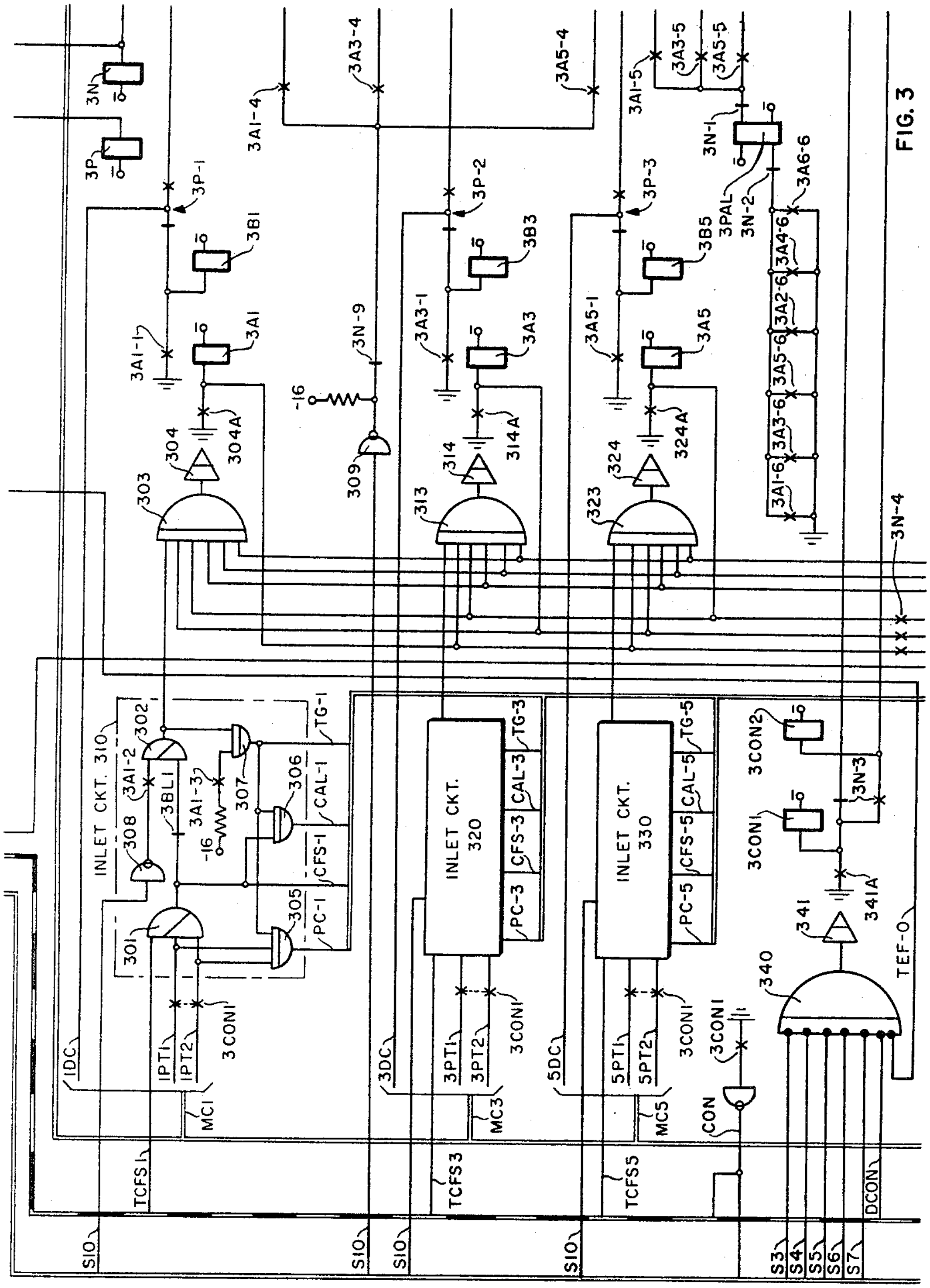

Referring to FIGS. 1 and 2, the transfer control circuit, when in normal operation, has groups 1, 3 and 5 connected to marker A and groups 2, 4 and 6 connected to marker B. Since no trouble is detected in the markers, relays MTA and MTB remain unoperated. The ground at open contacts MTA–1 and MTB–1 maintains transfer relay T unoperated, thus at the contacts T–1, the cable carrying leads for connecting trunk groups 1, 3 and 5 and 2, 4 and 6, to a common marker is open, and the markers each serve their assigned trunk groups. Relay T has a pair of magnetically opposing windings. Relays TA and TB are normally operated from the ground extended at normally closed contacts MTA–2 and MTB–2 respectively, connecting the information leads to their respective markers.

Assuming that a malfunction has developed somewhere in marker A, this information is sent to the trouble recorder, the trouble recorder initiates the request for transfer via lead TRF. Before the transfer can be initiated the companion marker must be in its idle state S10 and also not requesting transfer ($\overline{TBR}$). When these conditions are met, $[(S10A+TBRA)\ S10B\ TBR\ TRF]$ the true output of gate 202 operates relay driver 203 extending the ground from its contacts 203A to complete an operate circuit to relay MTA. Relay MTA locks on its own contacts. Ground at contacts MTA–4 operates transfer relay T, transferring groups 1, 2 and 3 to marker B. The ground at contacts MTA–2 is removed from relay TA, thus removing all information carrying leads from marker A.

If the trouble recorder does not respond to a call-for-transfer within 60–90 seconds after the call-for-trouble-recorder mark is sent, a relay transfer timer, consisting of a timer 220, gate 214, relay drivers 215 and 216, relays 2A and 2B with their associated circuits, will start a transfer operation.

Open circuit from ground at contacts 5N–10 not shown will prevent relay MTB from operating, thus, locking marker B from transferring.

To initiate a release, or back to normal operation of marker A, a true signal at the output of gate 205 on a command $$[(S10B+TBRB)\ S10A\ TBRA\ (RLS+\text{MANUAL})]$$

will operate relay driver 206. The ground at contacts 206A extends over the operate circuit to relay 2RS. Relay 2RS operates breaking a hold circuit from ground at contacts MTA–1, 2RS–1 to relay MTA. Relay MTA releases, removing the ground at contacts MTA–1 to relay T, and extending the ground at contacts MTA–2 to relay 2TA, the leads from groups 1, 3 and 5 are switched from marker B to marker A.

The transfer can also be initiated manually either from the trouble recorder or with the aid of pushbutton provided in each marker.

*Allotter and transfer circuit*

Allotter and transfer circuit provides a trunk group marker, which in conjunction with other circuits of the trunk group section uniquely identifies a trunk group which has a trunk requesting service; connects the marker to the proper trunk group; and transfers control of a set of trunk groups from one marker to the other.

Allotter circuit AT provides: detection means for a call-for-service mark from the trunk groups associated with the marker; means of selecting one trunk group on a random basis and locking out all others; detecting means of a call-for-service via two independent paths and means to give an alarm if the mark is not received on both paths; means to operate a relay in the selected trunk group to connect it to the marker; checking means, when in the normal (not transferred) condition, for use by the other marker associated with the same trunk groups; means for using the checking circuitry of the other allotter to monitor for allotter fault conditions; also means to give an alarm whenever there is not parity between the input and output signals of the two allotters.

*Operational description*

The drawings of FIGS. 2, 3, 4, 5 and 6, when arranged as shown in FIG. 16 show a schematic diagram of allotter A with its transfer control circuit and simplified schematic of allotter B and its transfer control circuit. In the normal (not transferred) condition, and the markers being in the idle state S10 the allotters AT–A and AT–B are continually sensing the outlets of B stages of their assigned trunk groups.

Each allotter is provided with the normally active section and the normally passive section. The active section of the allotter is assigned with the trunk groups it will serve in the normal (not transferred) condition and the passive section of the allotter is equipped to service the groups assigned to the companion allotter when required. As shown in the drawings of FIG. 3–6, the allotter of marker A is equipped with inlet circuits 310, 320 and 330 in the normally active section and inlet circuits 410, 420 and 430 in the normally passive section. The allotter of marker B has inlet circuits 510, 520 and 530 in the passive section and inlet circuits 610, 620 and 630 in the normally active section. A call-for-service mark is simultaneously detected in the active section of one marker and in the passive section of the other marker.

Assume that the trunk group 1 requests a service of the marker. A negative potential signal on leads 1PT1 and 1PT2 is simultaneously supplied to the inlet circuit 310 and inlet circuit 510. If the marker A is not in the sequence states S3–S7 the output of gate 340 is true, energizing relay driver 341. The ground at contacts 341A completes an operating path to relays 3CON1 and 5CON2 enabling the call-for-service mark to be detected in the allotter of marker A and in the allotter of marker B. The signals on leads 1PT1 and 1TPT2 at the input of inlet circuit 310 routed via contacts 3CON1, gate 301, normally closed contacts 381–1 gates 302 and 303 energize relay driver 304 to close its contacts 304A.

The ground at contacts 304A completes an operating path to relay 3A1 and locks out all other inputs from the trunk groups. A ground at contacts 3A1–1 via lead 1DC operates relay MDC in the trunk group matrix ot connect the trunk group to the marker A, and completes the operating circuit to relay 3B1. Contacts 3A1–2 prepare a holding path to gate 302 on lead S10, and contacts 3A1–3 supply a negative coincidence to gate 307. A true signal on lead TG–1 at the output of gate 307, through gate 452 advances sequence circuit 112 to state S9. A call-for-service mark CFS–1 on the output of gate 301 through gate 454, 456 and gate 457 starts the operational timer 109. The call-for-service mark CFS becomes true when the marker is not being reset (RST) and all connections in between the marker and the trunk group are present or the marker is not in state S9 or S10, lead H10.

$$H-10=(\overline{S9S10})+[[\overline{HC}\ VA)+RLS][(HC\ \overline{VB})+MTFA]]$$

HC=all connections on transfer relay T successful.

VA=all connections to marker A and its trunk groups successful.

VB=all connections to marker B and its trunk groups successful.

A true signal CAL–1 on the output of gate 306 extended through gate 453 indicates to the marker, that another call in the same matrix is being served. Also a parity check signal PC–1 is generated on the output of gate 305, to check for any faulty diodes in the crosspoint network. PC–1 is routed through gate 451 to parity check alarm circuit in the marker, and to trouble recorder.

Relay 3A1 remains operated throughout the entire cycle of the marker, or until the services of the marker for group 1 are not required, ($\overline{\text{CAL–1}}$). The holding path via lead S10, inverter 308, contacts 3A1-2 gate 302, gate 303, relay driver 304 keep relay 3A1 operated extending a holding ground at contacts 3A1–1 over lead 1DC to connect relay MDC in connect circuit. When the marker successfully completes its functions in states S10, S9, S1 and S2 and advances to state S3 a ground at contacts 341A is removed from operating circuit to relays 3CON1 and 5CON2, thus further detection of other call-for-service marks is interrupted at contacts of relays 3CON1 and 5CON2 on all PT leads.

A negative potential on leads 1PT1 and 1PT2 supplied to the input circuit 510, via contacts 5CON2 gate 505 normally closed contacts 5B2–1 gates 502 and 503 energizes relay driver 504. The ground at contact 504A extended through contacts 3A1–5 and 3N–1 completes an operating circuit to the upper winding of relay 3PAL. Relay driver 504 remains energized throughout the complete cycle of the marker A. The holding path for relay driver 504 extends from state S10 of marker A inverter 309, contacts 3N–9 and 3A1–4, gates 502 and 503 to relay driver 504. Relay 3PAL has a pair of magnetically opposing windings, so the ground extended via contacts 3A1–6 and 3N–2 to its lower winding will prevent relay 3PAL to be energized indicating to the trouble recorder that the parity between the output of the active section of allotter A and the passive section of allotter B has occurred. If the ground to one of the windings to relay 3PAL is absent while the ground to the other winding is present, relay 3PAL will be energized and at contacts 4PAL–1 via lead PAL indicates to the trouble recorder that lack of parity and that the malfunction has occurred.

Figure 4:
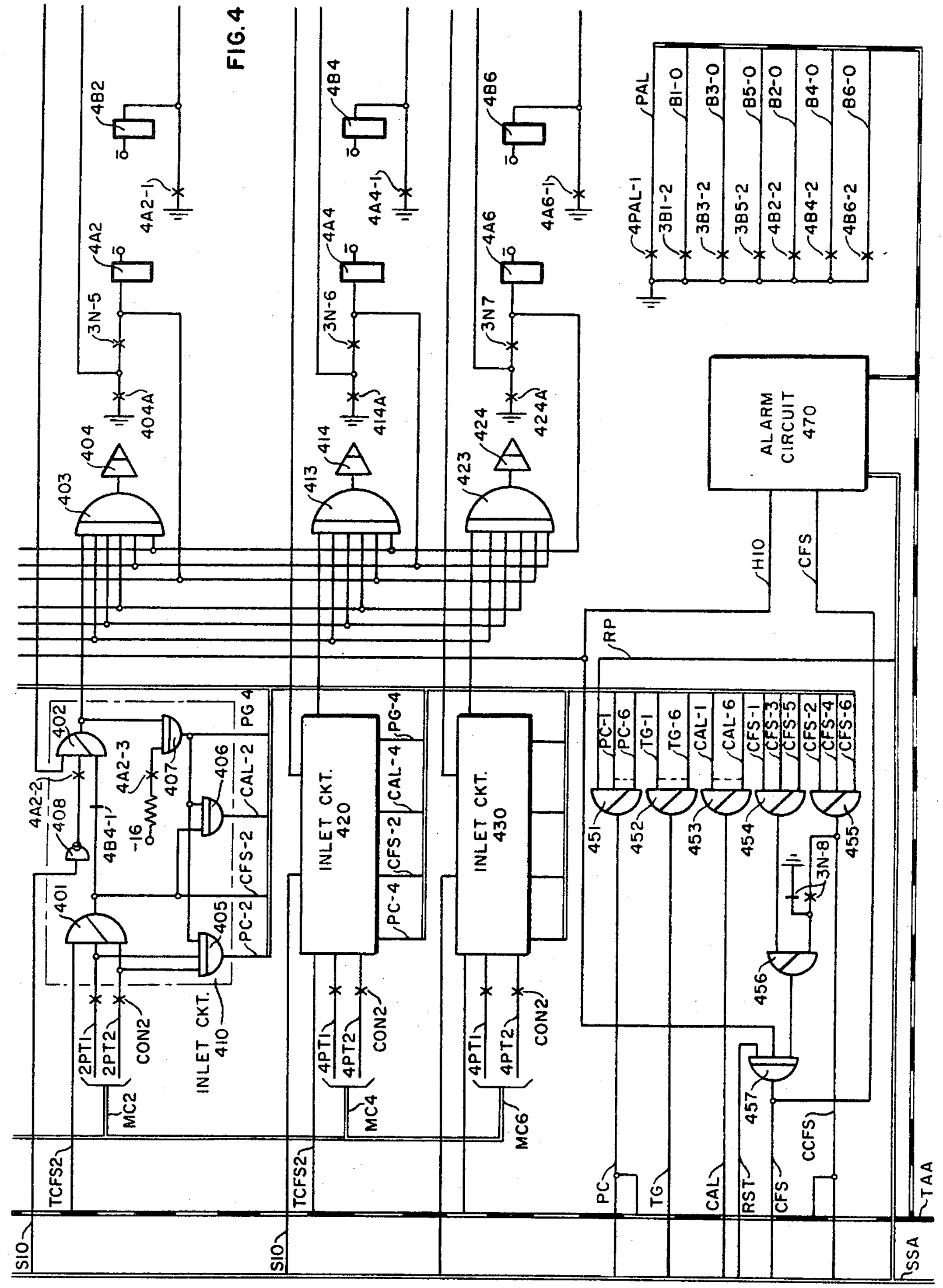
Figure 5:
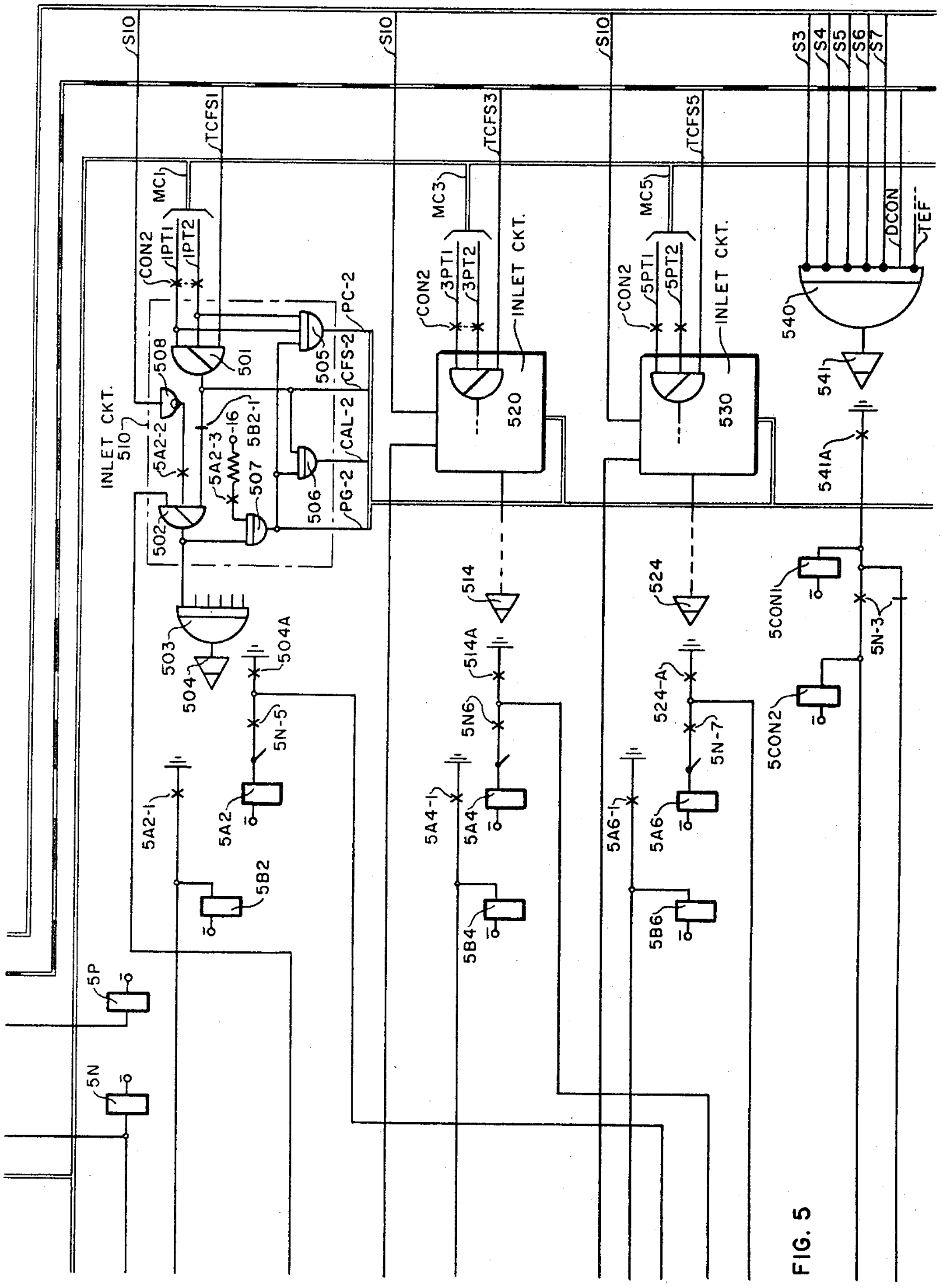
Figure 6:
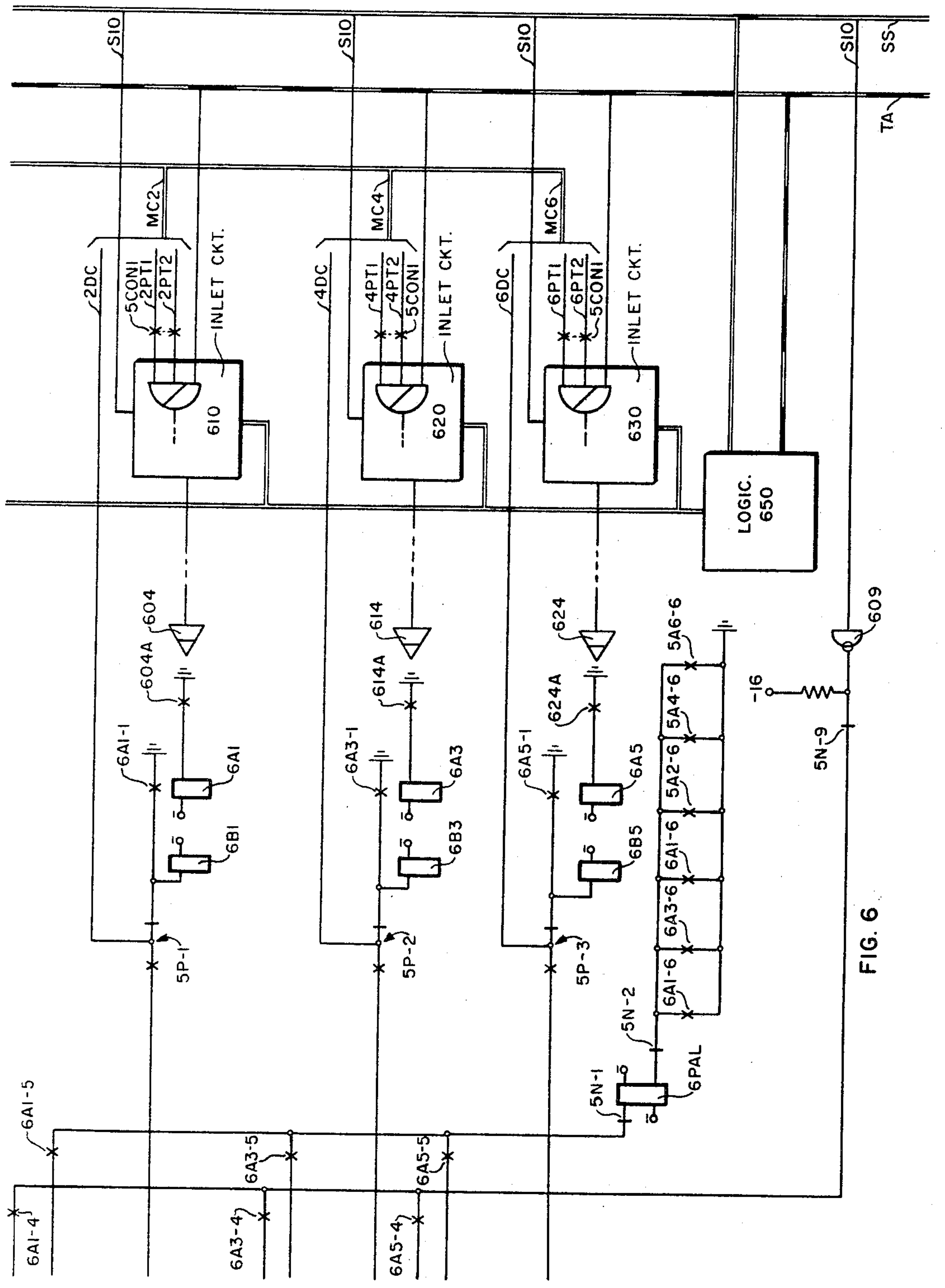
Figure 14:
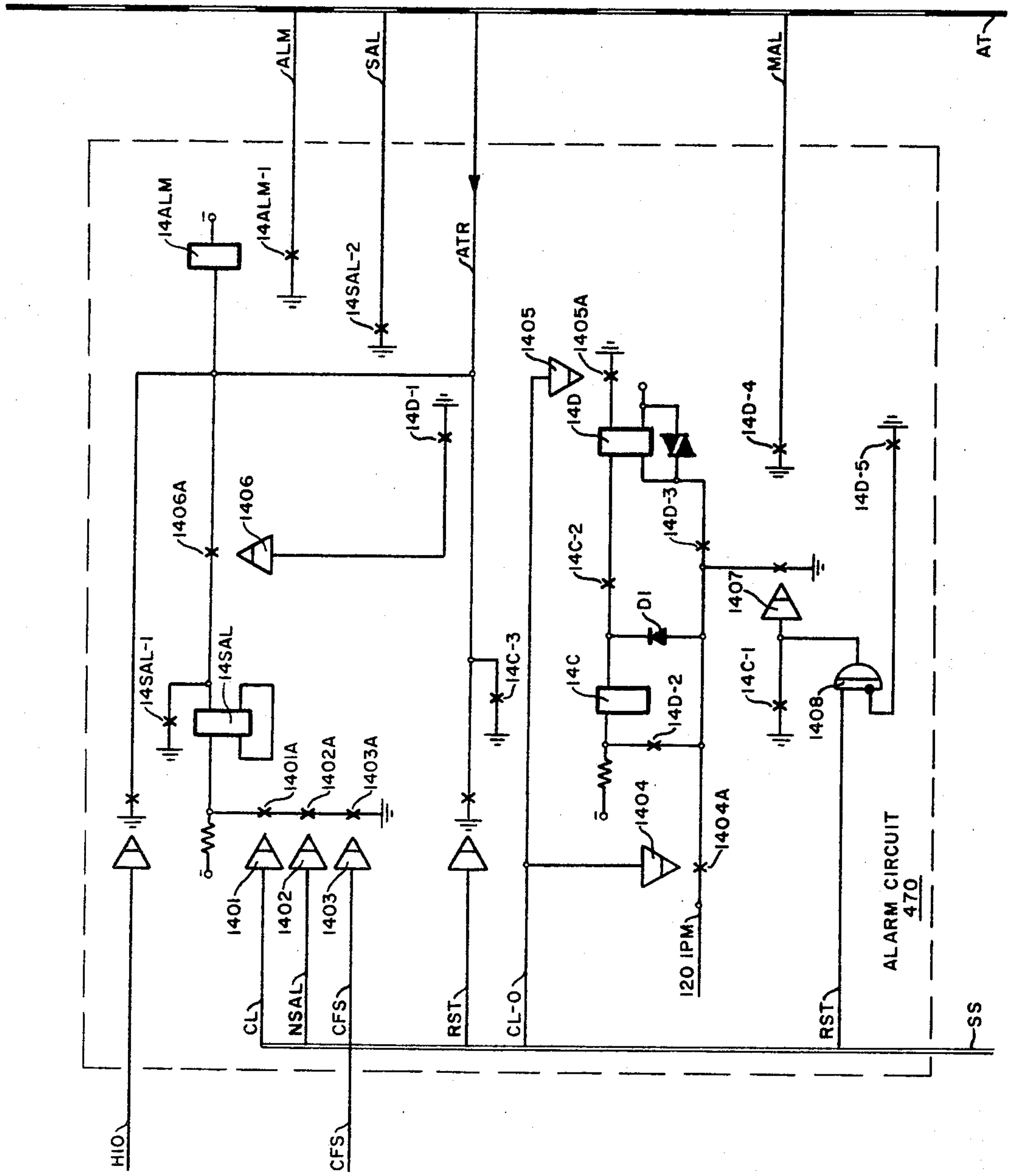
FIG. 14 is a schematic of the alarm circuit.

The alarm circuit 470 shown as a box in FIG. 4 and as a schematic diagram in FIG. 14, provides checking and alarm means as to the condition of the marker. The operational timer indicates the condition of each state of the marker, in addition, an alarm circuit 470 checks the marker to determine whether the marker advances from its clear state to state S1 and also if the marker completes its operating cycle within the allotted times.

Referring to FIG. 14, relay 14SAL upon being energized will remain energized from the ground extended at contacts 14SAL–1 through the upper winding to battery. When the call-for-service mark via lead CFS becomes true, relay driver 1403 is energized closing the ground through contacts 1403A and normally actuated contacts 1402A and contacts 1401A to relay 14SAL. Contacts 1401A are closed as long as the signal on lead CL is true, indicating that the marker is in either the idle state S10 or the clear state S9. Relay 14SAL having a shorted lower winding is slow to release. The release time being longer than the time required for the marker to advance from the clear condition to state S1. If the marker does not advance to state S1 within its preassigned time, relay 14SAL is deenergized, and at contacts 14SAL–2 places a ground potential on lead SAL to indicate to the trouble recorder, that a malfunction of the marker has occurred.

Upon the marker advancing to state S1, relay drivers 1404 and 1405 are energized closing their associated contacts 1404A and 1405A respectively. At the first pulse of ground potential from the 120IPM source, through contacts 1404A and diode D1 through relay 14C completes a circuit to a negative potential, energizing relay 14C. A ground potential on lead 120IPM will also prevent relay 14D to be energized. At the end of a complete cycle of the marker, the signal via lead CL–0 becomes not true, thus relay drivers 1404 and 1405 will release, preparing the alarm circuit 470 for another cycle check at contacts 1404A and 1405A.

Assume that the marker does not complete the operation cycle in the preassigned time. At the following absence of ground potential via lead 120IPM, relays 14D and 14C will be energized from the ground extended at contacts 1405A. The ground at contacts 14D–1 will deenergize relay driver 1406 breaking a holding path from ground at contacts 14SAL–1 to relay 14ALM, however the ground at contacts 14C–3 keeps relay 14ALM energized. The following ground potential pulse via lead 120IPM deenergizes relay 14C and completes a holding circuit to relay 14D at its lower winding. Relay 14ALM is deenergized, and signals at contacts 14ALM–1 via lead ALM and at contacts 14D–4 via lead MAL indicate to the trouble recorder a malfunction of the marker. A holding circuit comprising relay driver 1407 and gate 1408 will hold relay 14D energized until released by a manual switch.

However if the marker returns to the clear state prior to the release of relay 14C the timer is restored and at contacts 1404A and 1405A prepared for another cycle check.

When the clock pulses CPA and CPB are stopped, either manually or on command from the control center, a signal generated at the output of gate 790, FIG. 7, via lead NSAL will deenergize relay driver 1402, FIG. 14. Contacts 1402A break a path from ground to relay 14SAL, thus a check whether the marker has cleared states S9 and S10 in the preassigned time is not performed.

Assume that a transfer request has been initiated in marker B. The information as to what type of error has occurred is routed via test and routiner access circuit 113′ to the trouble recorder in the control center. On a command from the trouble recorder, relay MTB in the transfer control is energized. The information lead from trunk groups 2, 4 and 6 are transferred to marker A as previously described. The ground at contacts MTB–6 completes an operating path to relays 5N and 3N. Upon the operation of relays 5N and 3N parity checking relays 3PAL and 6PAL are disconnected. At contacts 3N–3 relay 3CON2 is enabled to operate in parallel with relay 3CON1. Contacts 3N–4 enable any gate in allotter A to lock out all other calls but the one served at the time.

Contacts 3N–5, 3N–6 and 3N–7 prepare an operating path to relays 4A2, 4A4 and 4A6 respectively. The ground at contacts MTB–5 completes an operating path to relay 5P. Relay 5P at contacts 5P–1, 5P–2 and 5P–3 transfers the operating ground for MDC relays in trunk groups 2, 4 and 6 from contacts 6A1–1, 6A3–1 and 6A5–1 in allotter of marker B to ground at contacts 4A2–1, 4A4–1 and 4A6–1 respectively. Contacts 3N–8 at the input of gate 456 enable call-for-service marks from trunk groups 2, 4 and 6 to be used by marker A. When the maintenance of marker B has been completed, and upon an initiation of back to normal (not transferred) operation previously described the markers resume serving their assigned trunk groups.

Figure 15:
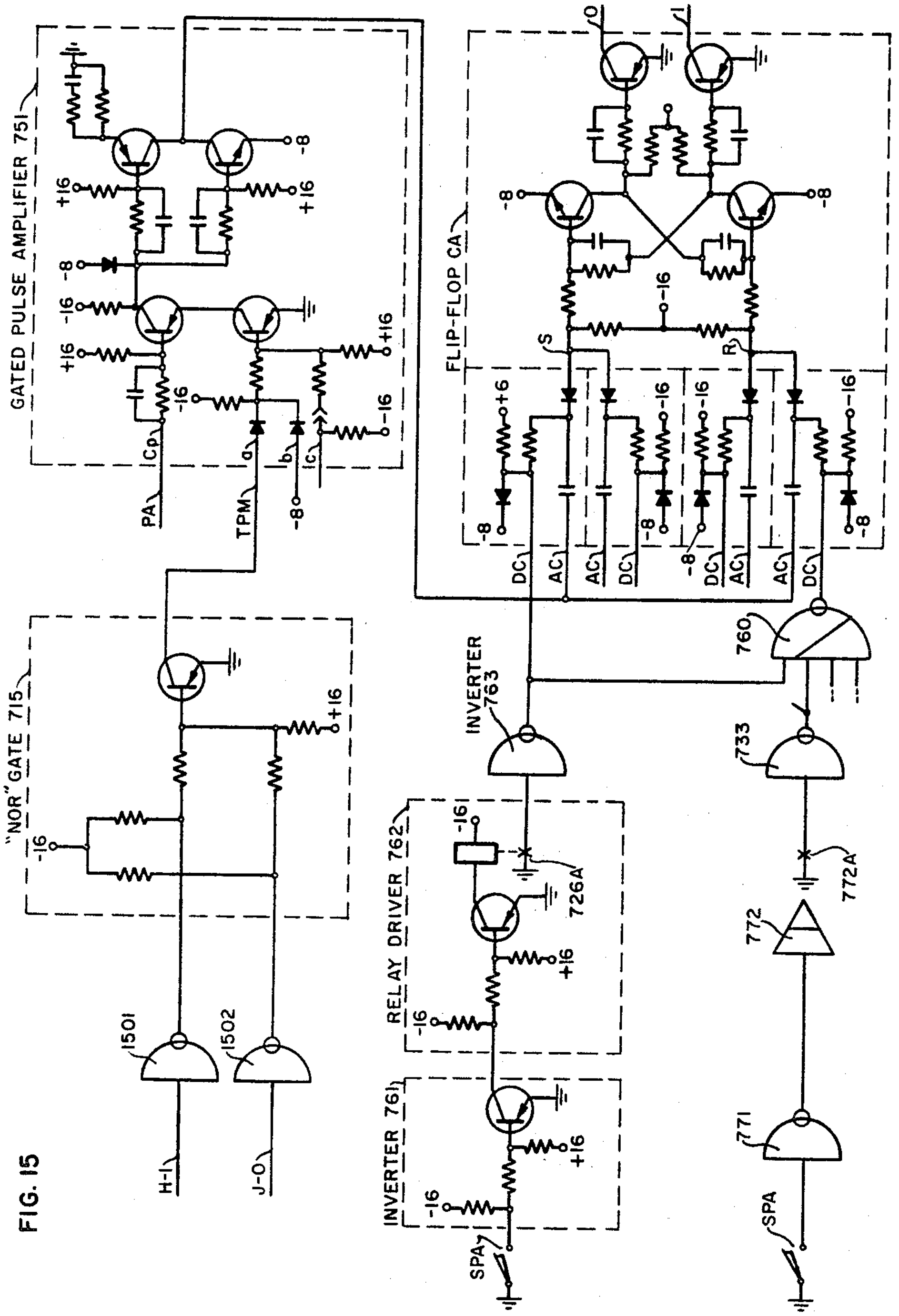
FIG. 15 is a schematic of part of typical building blocks used in the system.

To illustrate the typical electronic building blocks, FIG. 15 shows in schematic form part of the clock circuit of FIG. 7.

The gated pulse amplifier 751 comprises four transistors in a circuit arrangement having four input leads and one output lead. The upper input lead designated CP is the pulse input. The second and third inputs designated *a* and *b* to respective diodes from an AND gate for D.C. input control signals. The lower input designated *c* is for a single direct current control input. Thus the gate is enabled with true (negative potential) signals at inputs *a* and *b* in coincidence, or by a single input. When the gated pulse amplifier is in the enabled condition the pulse at input CP, in this case the pulse PA are gated and amplified to the output lead.

The flip-flop CA of the clock circuit 110 comprises four transistors. As shown in FIG. 15, the lower output lead is "one" output, and the upper lead is the "zero" output on the right hand side of the flip-flop. At the left hand side the four input pulse coincidence gates are shown. Each of these gates has a D.C. input via a capacitor and a D.C. input via a resistor. Each D.C. input has a negative potential biasing arrangement. The two upper coincidence gates are connected through respective diodes forming an OR gate to the set input of the flip-flop. The two lower coincidence gates are connected through respective diodes to the reset input of the flip-flop. With biasing arrangement as shown, unused inputs may be left open circuited.

FIG. 15 shows how the AND gate function supplied by gate 751 in FIG. 7 may be implemented by means of a NOR gate 715′. Using a NOR gate for the AND function requires that each of the input signals be inverted. Thus the inverters 1501 and 1502 are added to the inputs of NOR gate 715′, FIG. 15.

The NOR gate 715′ comprises a single transistor with resistance input circuits to the base electrode. The collector bias potential is supplied by the succeeding circuit through a resistor to a negative 16-volt source. The emitter electrode is grounded.

The inverter is similar to a NOR gate except that it has only a single input.

The relay driver circuit is similar to the inverter circuit, except that it has a relay winding in series with the collector electrode of the transistor. This winding operates a single contact. As shown in the drawing the output at contacts 762A is supplied to the inverter 763, FIG. 15.

While the principles of the invention have been described in connection with specific apparatus, it is to be clearly understood that this description is made only by way of example and not as a limitation to the scope of the invention.

What is claimed is:

1. An arrangement for normally supplying interlaced trains of repetitive pulses on two output leads with provisions for blocking the normal repetitive pulses from the output leads and for manually controlling the supply of a single pulse to either output lead upon each operation of a manual control corresponding to the particular output lead;

said arrangement comprising a source of cyclically recurring clock pulses on first and second input leads, the pulses on each lead occurring during the interpulse interval of the other lead and having the same cycle time, said input leads being coupled via first and second input pulse gates to first and second intermediate leads respectively, and said intermediate leads being coupled via first and second output pulse gates to first and second output leads respectively, each of said pulse gates having direct current control means normally enabled to cause the gates to pass all of the pulses on the respective leads;

manually controlled stop means coupled to the said direct current control means operated to block all four of said pulse gates;

a source of cyclically recurring timing pulses having a cycle time equal to several of said clock pulse cycles, each timing pulse having a duration at least equal to one pulse cycle;

said source of timing pulses being coupled to the direct current control means of said input pulse gates to enable them to pass only one pulse to each said intermediate lead during each timing pulse cycle;

first and second bistable devices;

first and second manually controlled switch means for selectively controlling the supply of only one pulse to the corresponding output lead upon each operation of one of these switch means;

said switch means and said intermediate means being coupled to said bistable devices to set the one of the bistable devices corresponding to an operated one of the switch means upon the occurrence of a pulse on the opposite intermediate lead, the outputs of said bistable devices being coupled to said direct current control means of said output pulse gates to respond to one of the bistable devices being in the set condition while the other is in the reset condition to enable the pulse gate corresponding to the bistable device in the set condition to pass the next pulse occurring on the corresponding intermediate lead to the corresponding output lead, a connection from the output of each bistable device to the input of the opposite bistable device to set said opposite bistable device upon the next occurrence of a pulse on said opposite intermediate lead to thereby block said output pulse gates responsive to the bistable devices being both in the same condition, and means responsive to restoration to normal of said switch means upon the occurrence of a pulse on a given one of said intermediate leads to reset both of said bistable devices, whereby further pulses to said output leads are blocked.

2. The arrangement as claimed in claim 1 wherein said first and second manually controlled switch means each comprises a manual switch coupled to an amplifying device having an output including a relay winding which actuates one set of contacts, said set of contacts being coupled to supply a signal to said corresponding one of the bistable devices, the set of contacts having a characteristic such that any bounce on operate occurs during one said timing cycle.

3. The arrangement as claimed in claim 1, further including visual indication means comprising another bistable device coupled to said manually controlled switch means and to said output leads to be set responsive to the actuation of one of the manually controlled switch means upon the occurrence of a pulse on the corresponding output lead, first and second visual indication devices and means coupled to the output of said other bistable device and the manual controlled switch means to actuate the indicating device corresponding to the operated manually controlled switch means.

4. The arrangement as claimed in claim 3, wherein said means to reset said bistable devices comprises a gate having inputs coupled to said manually controlled switch means and to the outputs of said first and second bistable devices arranged to detect the coincidence of both of the manually controlled switch means being restored and both of the first and second bistable devices being set to provide a signal to the first and second bistable devices and said other bistable device to reset them upon the occurrence of said pulse on a given one of said intermediate leads.

5. The arrangement as claimed in claim 1, wherein said stop means comprises an amplifying device having an output including a relay winding which actuates one set of contacts which supply a signal to the direct current control means of all of said pulse gates, a latch circuit comprising two inverter devices having the output of each coupled to the input of the other, the output of one of the inverter devices being coupled to the input of said amplifying device, a momentary closing type manual switch coupled to the input of one of the inverter devices to actuate the latch circuit to the operated condition in which the set of contacts is caused to be operated, and another momentary closing type manual switch coupled to the input of the other inverter to actuate the latch circuit to the release condition.

6. The arrangement as claimed in claim 5, wherein said stop means further includes a lead coupled from the output of said latch circuit to a switching device of an alarm arrangement.

7. In a communication switching system, a first set and a second set, each set comprising a plurality of switching groups, with a first marker and a second marker which normally respectively serve the switching groups of the first set and the second set to control the establishment of switched communication paths, with a transfer arrangement for serving all of the switching groups from either marker while taking the other marker out of service, each marker having an allotter, each switching group having an arrangement to supply a call for service signal to an individual input connection of the allotter of each marker, with each allotter arranged to receive all of the call for service signals from the switching groups in both sets, and to normally respond only to signals from switching groups in its own set to select one group which is supplying a call for service signal and connect it to its marker, each allotter being arranged to respond to any call for service signal when all of the switching groups are transferred to the corresponding marker;

the improvement comprising a parity check circuit in each allotter including a parity check relay having two windings differentially connected with one winding connected to be energized responsive to an output signal in that allotter, and the other winding connected to be energized in response to the corresponding signal having been detected in the other allotter so that the relay only operates when the signal is detected in one allotter but not in the other.

8. In a communication switching system, the combination as claimed in claim 7, wherein each allotter comprises a plurality of normally active stages corresponding individually to the switching groups in its own set, and another plurality of normally passive stages corresponding respectively to the other set for the other marker, each stage having an input section to detect a call for service signal from the corresponding switching group, a selection section coupled to the input section for generating an output signal, and an output relay connected to the selection section for transmitting a connect signal to the corresponding switching group, the output relays of the passive stages being disconnected from their selection sections by switching means associated with the transfer arrangement, the stages of the selection sections of the stages of the active stages having a lockout arrangement in which each output signal is coupled to the other active stages to inhibit them so that only one active stage may generate an output signal, there being switching means associated with the transfer arrangement to connect the passive stages into said lockout arrangement along with the active stages, said parity check relay having said one winding connected to be energized via contacts of the output relay of its own allotter and said other winding connected to be energized responsive a signal from the selection section of the passive section of the other allotter.

9. In a communication switching system, the combination as claimed in claim 7, wherein each of said markers includes sequence circuits providing a plurality of sequence states one state being an idle state in which the allotter detects call-for-service signals and connects one switching group in which a call for service originates to the marker, a plurality of said states forming a marker cycle in which the marker identifies one calling line in the allotted switching group and completes a connection thereto through the switching network, and another of said states being a clear state at the end of a marker cycle from which another cycle may be initiated for another call for service in the same allotted group, or from which the idle state may be entered;

an operational timer in each marker for providing time for the operations during certain of the marker states, said operational timer also being arranged to time the elapsed time in which the marker remains in each sequence state and to cause initiation of a trouble signal in response to the marker remaining in any state beyond a given time;

a separate main alarm relay timing arrangement which is started whenever the marker cycle is started, and which times the overall time required for one marker cycle, and means to initiate a trouble signal in response to the overall time for one marker cycle exceeding another given time;

a subalarm arrangement which is started in response to each call for service signal received by the allotter, arranged to supply a trouble signal in response to the marker remaining in the idle or clear state for more than a given time after receipt of a call for service signal.

10. In a communication switching system the combination as claimed in claim 9, wherein said subalarm arrangement comprises a relay having a winding which is normally energized, and deenergized during the clear and idle states, after a receipt of a call for service signal, said relay having a release time substantially greater than the time for the marker to leave the idle and clear states, said relay will not restore unless the said time is exceeded before the marker starts the normal marker cycle.

No references cited.

KATHLEEN H. CLAFFY, *Primary Examiner.*

A. A. McGILL, *Assistant Examiner.*